(No Model.)
F. H. CARTER.
WIRE REEL CARRIER.
No. 490,899. Patented Jan. 31, 1893.
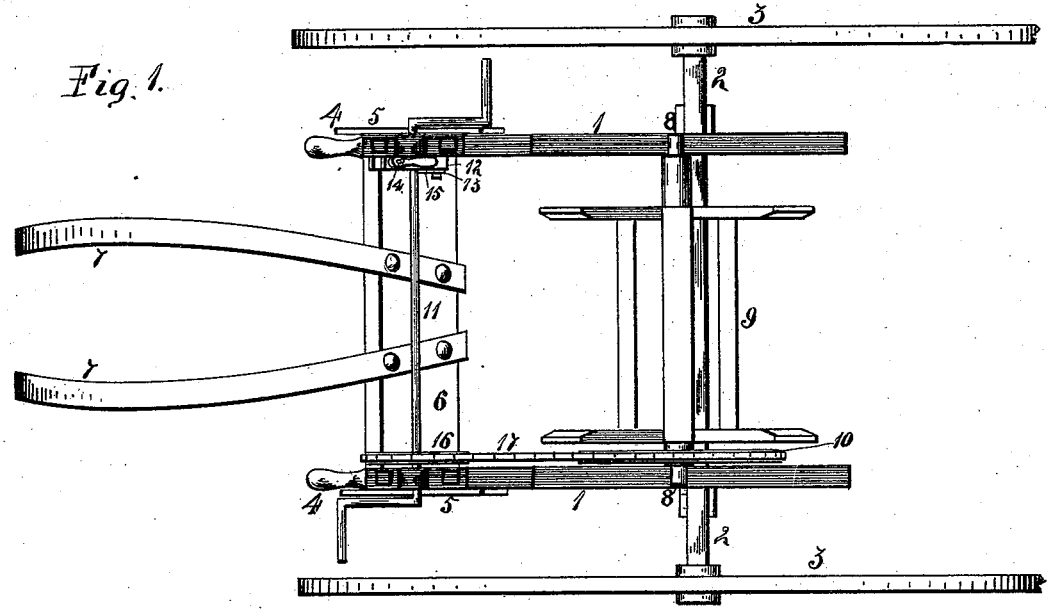
Fig. 1.
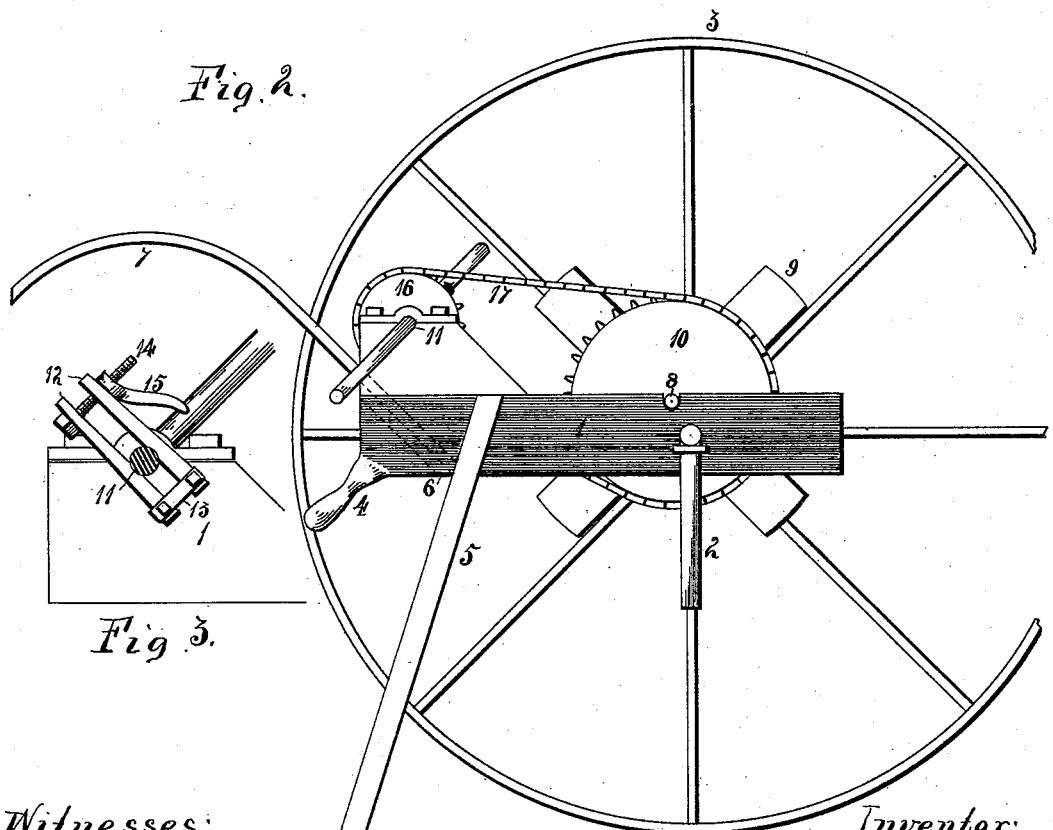
Fig. 2.
Fig. 3.
Witnesses:
J. S. Clark
L. A. Clark
Inventor:
Floyd H. Carter
By A. O. Behel
Atty.

UNITED STATES PATENT OFFICE.

FLOYD H. CARTER, OF SHIRLAND, ILLINOIS.

WIRE-REEL CARRIER.

SPECIFICATION forming part of Letters Patent No. 490,899, dated January 31, 1893.

Application filed September 10, 1892. Serial No. 445,575. (No model.)

*To all whom it may concern:*

Be it known that I, FLOYD H. CARTER, a citizen of the United States, residing at Shirland, in the county of Winnebago and State of Illinois, have invented certain new and useful Improvements in Wire-Reel Carriers, of which the following is a specification.

The object of this invention is to construct a barb wire reel, having a suitable frame mounted upon supporting wheels, the frame provided with bearings which support a spool to receive the wire and a transverse shaft having a chain belt connection with the spool, the frame also provided with handles and with curved bars which rest upon the shoulders of the operator during the winding and unwinding of the wire from the spool, in order that the hands of the operator may be free to turn the transverse shaft and rotate the spool.

In the accompanying drawings—Figure 1 is a plan view of a barb wire reel embodying my improvements. Fig. 2 is a side elevation of the same with one of the carrying wheels removed to more clearly show the parts. Fig. 3 is an enlarged elevation of the friction device employed to prevent the unwinding of the spool.

The main frame of my improved reel in this instance consists of the lengthwise beams 1 to which is connected an axle 2, having its center depressed sufficiently to allow the spool to rotate, and upon the ends of the axle are mounted carrying wheels 3. The rear ends of the beams 1, at their lower corner, are provided with handles 4. Legs 5 hold the frame in a horizontal position. An inclined bar 6 connects the rear ends of the beams and to its upper face are secured the curved bars 7, which extend upward and rearwardly. The upper faces of the beams 1, rearward of the axle 2, are provided with recesses which receive the journals 8 of the spool 9, which is of the usual construction. A sprocket wheel 10 is secured to the spool and rotates therewith. The rear end of the beams, on their upper faces are made with a half box, over which is located a half box forming a bearing for the transverse shaft, which has its ends bent forming handles by which the shaft is rotated. A friction device for preventing the unwinding of the wire upon the spool, consists of two bars 12, which are connected at their ends by a cross bar 13 and bolts passing through the cross bar and ends of the bars 12 into the lengthwise beam 1, hold the friction device in connection therewith. The bars 12 extend on each side of the transverse shaft and a bolt 14 connects the free ends of the bars and receives a threaded nut with a handle 15 employed to compress the free ends of the bars, thereby increasing the pressure upon the transverse shaft. A sprocket wheel 16 is secured to the transverse shaft and a chain belt 17 connects this sprocket wheel with the sprocket wheel 10 secured to the shaft of the spool.

In taking down a barbed wire fence the operator connects one end of the wire to the spool and placing the curved bars 7 upon his shoulders his hands are free to grasp the cranks of the transverse shaft, and by turning them he imparts a rotary movement to the spool through the chain belt connection, and as the spool is rotated the wire will be wound thereupon which movement will draw the reel along the ground in the direction of the wire, and the handles 4 are employed in connection with the curved bars 7 in transporting the reel over the field and in unwinding the wire from the reel.

I claim as my invention—

1. A wire reel carrier composed of a frame supported upon carrying wheels, said frame supporting a spool and a transverse shaft having a chain belt connection, the ends of the transverse shaft being in crank form, curved bars which have a connection with the frame, and rest upon the shoulders of the operator and the rear ends of the frame provided with handles.

2. A wire reel carrier composed of a frame supported upon carrying wheels, said frame supporting a spool and a transverse shaft having a chain belt connection, the ends of the transverse shaft being in crank form, curved bars which have a connection with the frame, and rest upon the shoulders of the operator, the rear ends of the frame provided with handles and a friction device having a connection with the frame and an engagement with the transverse shaft for preventing the unwinding of the wire from the spool.

FLOYD H. CARTER.

Witnesses:
A. O. BEHEL,
J. S. CLARK.